Patented June 16, 1931

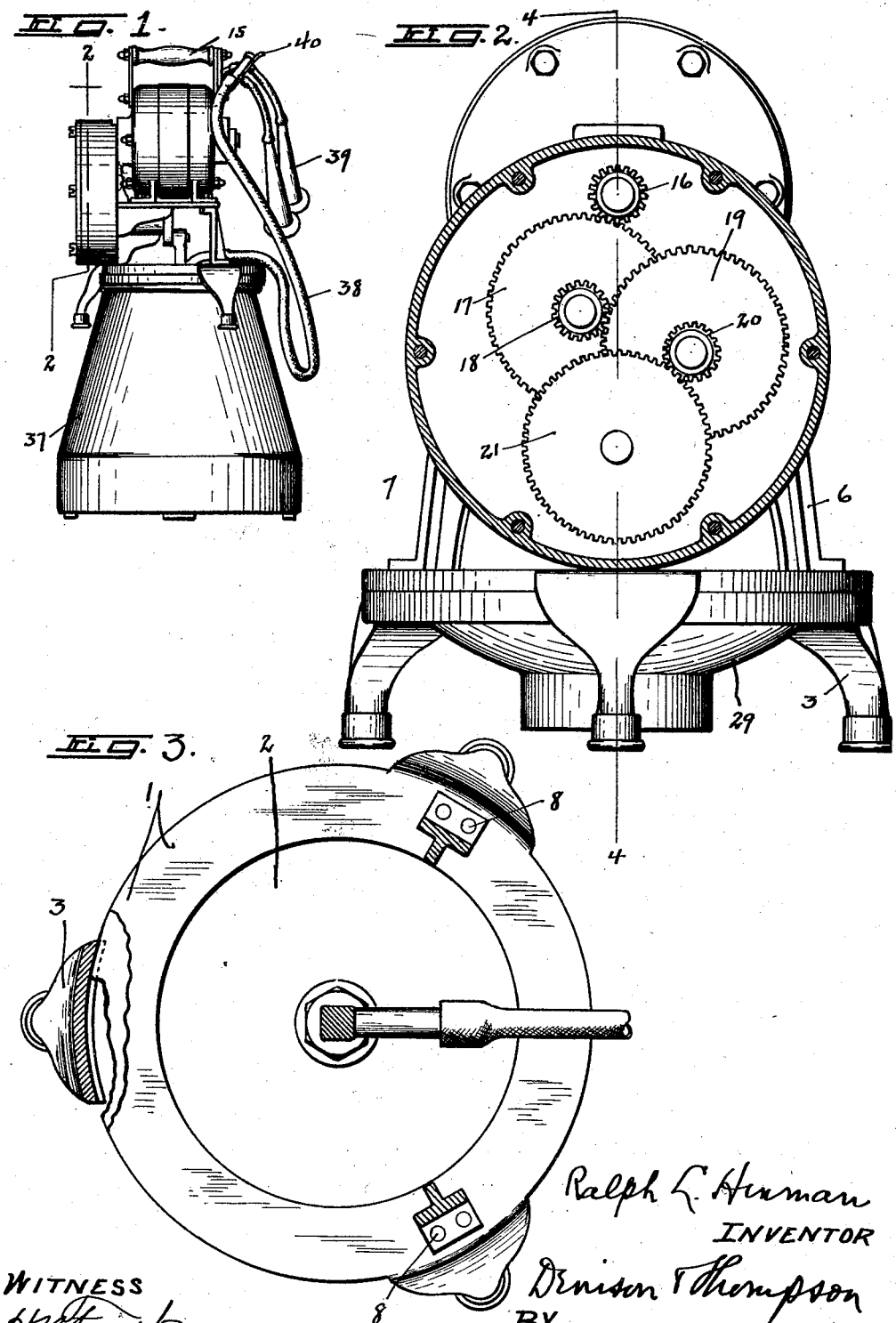

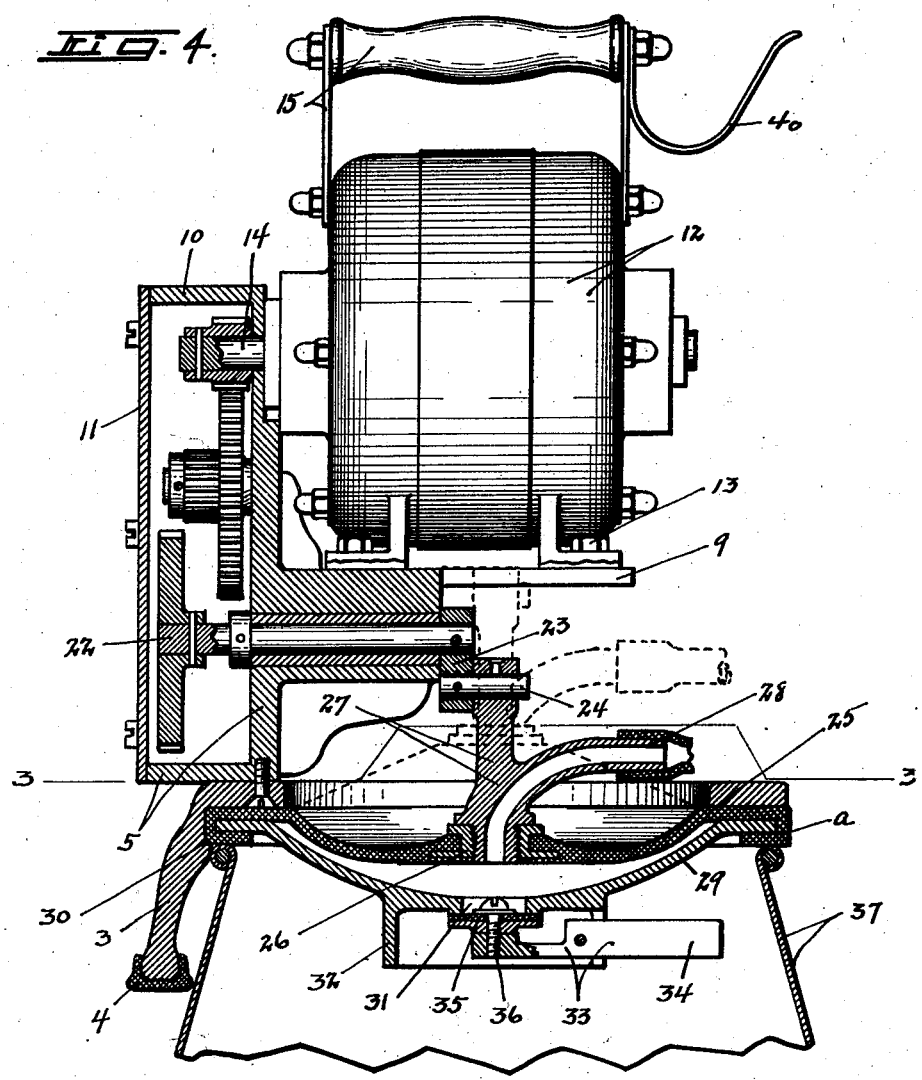

1,810,477

UNITED STATES PATENT OFFICE

RALPH L. HINMAN, OF ONEIDA, NEW YORK, ASSIGNOR TO HINMAN MILKING MACHINE COMPANY, INCORPORATED, OF ONEIDA, NEW YORK, A CORPORATION OF NEW YORK

MILKING MACHINE

Application filed April 27, 1928. Serial No. 273,385.

This invention relates to a new and improved portable milking machine.

In milking machines hitherto known to the art, whether portable or not, it has been necessary to have two units, one unit composed of the valve chamber and teat cup, and the other unit composed of the motor and pump.

In this construction where the device has been made small enough so that it may be moved from place to place, it is of necessity unwieldy and difficult to transport because of the fact that these two units are used. Furthermore, it is also necessary when such a device is in operation to have the power unit placed where it is subject to stable dirt. Furthermore, in milking machines of the type just described, a serious drawback of necessity exists in that the warm air in the valve chamber will be drawn into the pump and will be there condensed with a resulting dilution of the oil in the pump and a diminishing of the pump's efficiency. Warm air from the milk pail will also be drawn into the vacuum pipes and the moisture in the warm air will be there condensed and returned to the pail in the fresh milk.

Furthermore, this type of milking machine is difficult to reassemble when it is desired to clean the apparatus, and this, of course, is necessary very frequently.

The main object of my invention is to provide a unitary, portable milking machine of such a weight and compactness that it may be easily transported from place to place.

Another object of my invention is to provide a milking machine so constructed that there will be no possibility of any outside air being drawn into the device and in consequence there can be no condensation of moisture on the operating part.

Another object is to provide a milking machine in which the parts which come in contact with the milk during the milking operation may be easily and quickly disassembled and assembled when it is desired to clean the machine.

Other objects and advantages relate to the size, shape and arrangement of parts, all as will more fully appear from the following description taken in connection with the accompanying drawings, in which:—

Figure 1 is a perspective view of my device in position on a milk pail.

Figure 2 is a section on line 2—2, Figure 1.

Figure 3 is a section on line 3—3, Figure 4.

Figure 4 is a section on line 4—4, Figure 2.

My device consists of a base —1— preferably circular in shape, with a central opening —2— for the reception of a diaphragm hereinafter to be described. Base —1— is provided with a plurality (in this case shown as three) of short legs —3— preferably equipped with rubber-caps —4—. On the top face of base —1— I provide a frame —5— supported on legs —6— and —7— secured to base —1— by rivets —8—, or other convenient means.

Frame —1— is provided with a platform —9— positioned over central opening —2— and has at one side a gear case —10— provided with a removable cover —11—.

It being desirable, altho not necessary, to operate my device by electricity, a motor —12— is secured on the upper face of platform —9— by bolts —13— with armature shaft —14— extending into gear case —10—. For the purpose of facilitating the handling of the device, I provide on the top of motor —12— a handle —15—. Armature shaft —14— has on its outer end a pinion gear —16— in mesh with a gear —17— journaled in frame —5—. Gear —15— carries at its axis a spur gear —18— in mesh with a gear —19— also journaled in frame —1—. Gear —19— carries at its axis a spur gear —20— in mesh with a gear —21— secured to the outer end of a shaft —22— which is journaled in frame —5—.

Shaft —22— extends through frame —5— and carries on its inner end a crank —23—, which crank —23— carries on one end a stub-shaft —24—. A circular diaphragm —25— preferably of rubber, and of a diameter somewhat larger than the diameter of the opening —2—, is formed with a threaded collar —26— at its axis. A T-shaped member —27— has one end in threaded engagement with collar —26— and has the opposite end journaled on shaft —24—. The third arm —28— of T-shaped member —27— extends outwardly in approximately a horizontal plane, and has a hole therethrough extending through T-shaped member —27— to and through the end of T-shaped member —27— which is in threaded engagement with the collar —26—.

A hollow parti-spherical milk bowl —29— of approximately the same diameter as diaphragm —25— is positioned underneath diaphragm —25—. For the purpose of releasably holding diaphragm —25— and milk bowl —29— in position, I provide on the inner faces of legs —3— slots —30— of a size to receive the edges of diaphragm —25— and milk bowl —29—. Diaphragm —25— is preferably of a diameter sufficiently great so that it may be return bent on milk bowl —29— as indicated at —a—. Diaphragm —25— being of rubber or other resilient material, the asembly of diaphragm —25— and milk bowl —29— may be very easily pushed into and removed from slots —30—.

Milk bowl —29— has an aperture —31— at its central point and is formed with a depending circular discharge spout —32—. A lever —33— is pivotally mounted on the under face of milk bowl —29— and carries on one end a counter-weight —34— and on the upper face of its other end a valve —35— held in position by a screw —36—, and so positioned that it will be normally held upward against the bottom of milk bowl —29— and covering the aperture —31—. The relation of the weight of the valve end of lever —33— to the counter-weight teat end of lever —33— is such that the valve —35— will be held in position over aperture 31, but when milk is present in milk bowl —29—, the additional weight and pressure on valve —35— will overcome the effect of counter-weight —34— so that the valve will open and the milk will be discharged through aperture —31—.

The size and shape of my structure is such that when it is placed in position on the top of a milk can —37—, as perhaps may best be seen from Figure 4, the top of the milk can will contact with the outer edge of the assembly of diaphragm —25— and milk bowl —29— so that the weight of the device itself will hold diaphragm —25— securely in position so that it will be sealed to milk bowl —29— and base —1— throughout its entire periphery.

I provide a flexible pipe —38— having one end positioned on arm —28— of T-shaped member —27— and carrying on its other end a plurality of teat cups —39—, usually four in number, altho here shown as two. For convenience in transporting my device I provide at one end of handle —15— a clip —40— on which the teat cup assembly may be hooked, as shown in Figure 1.

It will be understood that when the motor —12— is connected to any convenient source of potential (not shown) the rotation of armature shaft —14— will through the train of gears —16—, —17—, —18—, —19—, —20— and —21—, cause the rotation of shaft —22— and the rotary movement of crank —23—. T-shaped member —27— being connected at one end to diaphragm —25—, and being connected at the other end to shaft —24—, the rotation of shaft —22— will cause the upper end of T-shaped member —27— to be carried around the axis of shaft —22— with the resulting raising and lowering of diaphragm —25—.

When the teat cups —39— are in position on the teats of a cow, and the device is operated, diaphragm —25— being flexible, the raising of the same will cause a partial vacuum in the space between it and milk bowl —29—, valve —35— being closed, and this partial vacuum will cause a suction on pipe —38— and will draw milk from the udder of the cow into milk bowl —29—.

When the diaphragm —25— is moved downwardly the valve —35— will open and the milk will pass from milk bowl —29— through aperture —31— and through discharge spout —32— into milk pail 37, the discharge spout —32— directing the flow of the milk downwardly. The continued operation of the device will cause a succession of the results just described until the supply of milk in the udder of the cow is exhausted. The device may then be moved and operatively connected to another cow.

It is desirable that the spout —32— be of a size and shape to act as a base for the milk bowl —29— when the same is disassembled from the apparatus and protect the valve —33— from injury. It is also desirable that the gear case —10— be packed with lubricant and it is also preferable that the bearing between the shaft —24— and the upper end of T-shaped member —27— be of an oil-less type so that mechanical attention to the operating parts of the device will have to be given only at very long intervals.

It will be understood that the exact size and shape of the different parts of my structure and the materials of which they are made may be varied to a considerable extent without departing from the spirit of my invention, for altho I have shown and described a specific structure and form and relation of parts as an exemplification of an embodiment of my invention, I do not desire to restrict myself to the exact size, shape or relation of parts, as various changes may be made within the scope of the appended claims.

I claim:

1. In a device of the class described, a frame having a central opening therethrough, a flexible diaphragm having an annular groove, a milk bowl having its periphery positioned in such annular groove, grooves in the frame for receiving the rim of the diaphragm whereby the diaphragm will be releasably held in position beneath the central opening of the frame, and means for moving the diaphragm in relation to the milk bowl.

2. In a device of the class described, a frame having a central opening therethrough, a flexible diaphragm having an annular groove, a milk bowl having its periphery positioned in such annular groove, grooves in the frame for receiving the rim of the diaphragm whereby the diaphragm will be releasably held in position beneath the central opening of the frame, a milk conduit extending through the diaphragm, and means for moving the diaphragm in relation to the milk bowl.

In witness whereof I have hereunto set my hand this 19 day of April, 1928.

RALPH L. HINMAN.